3,484,348
QUATERNARY AMMONIUM SALT RECOVERY
Robert Johnson and Roy E. Jones, Pensacola, Fla., assignors to Monsanto Company, St. Louis, Mo., a corporation of Delaware
No Drawing. Filed June 7, 1967, Ser. No. 644,066
Int. Cl. B01k 1/00
U.S. Cl. 204—73                                    10 Claims

ABSTRACT OF THE DISCLOSURE

Quaternary ammonium salts can be recovered in high purity from an acrylonitrile electrohydrodimerization effluent by extracting the effluent with water and acrylonitrile, and thereafter extracting at least a portion of the resulting quaternary ammonium salt-containing aqueous phase with acrylonitrile.

BACKGROUND OF THE INVENTION

It is known that adiponitrile can be produced by electrohydrodimerization of acrylonitrile. In general, the reaction is carried out in the cathode compartment of an electrolytic cell having anode and catohde compartments separated by a cation permeable membrane. An aqueous solution containing a strong mineral acid such as sulfuric acid is circulated through the anode compartment, and an aqueous solution containing an electrolyte and acrylonitrile is circulated through the cathode compartment. For use as the electrolyte, quaternary ammonium salts such as tetraalkylammonium alkylsulfates, arylsulfonates and alkarylsulfonates in which each alkyl group contains from one to four carbon atoms are preferred, and best results are generally obtained with tetraethylammonium ethyl sulfate, tetramethylammonium methyl sulfate, tetramethylammonium toluene sulfonate, tetraethylammonium benzene sulfonate, trimethylethylammonium methyl sulfate, triethylmethylammonium ethyl sulfate, triethylmethylammonium benzene sulfonate, triethylmethylammonium toluene sulfonate or the like. As current is passed from electrode to electrode through the conducting solutions and membrane, acrylonitrile in the cathode compartment is converted to adiponitrile in accordance with the following reaction:

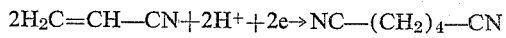

$$2H_2C=CH-CN+2H^++2e \rightarrow NC-(CH_2)_4-CN$$

Adiponitrile is normally withdrawn from the cell in a cathode compartment effluent which typically contains impurities that may include reaction by-products such as propionitrile, bis-cyanoethylether and hydroxypropionitrile, hydrolysis products thereof such as organic acids (e.g. propionic, cyanovaleric and adipic acids), divalent sulfate ions that may have migrated through the membrane from the anode compartment and/or quaternary ammonium metal salts of such sulfate ions or hydrolysis products.

Economic operation of the electrohydrodimerization process requires an efficient technique for recovery and reuse of the quaternary ammonium electrolyte in the cathode compartment effluent. U.S. Patent No. 3,267,131 describes a method for substantially completely separating an electrolytic quaternary ammonium salt from organic constituents of the cathode compartment effluent by extracting the effluent with acrylonitrile and water. However, it has been found that other, substantially water-soluble impurities such as the aforementioned organic acids, divalent sulfate ions and/or quarternary ammonium or metal salts thereof tend to accumulate in the quaternary ammonium salt-containing aqueous phase from such an extraction and adversely affect the yield of adiponitrile when the electrolyte so recovered is reused in the electrohydrodimerization process. Accordingly, a method by which the electrolytic quartenary ammonium salts can be recovered with substantially lower concentrations of each other impurities is very desirable, and it is an object of this invention to provide such a method.

SUMMARY OF THE INVENTION

It now has been discovered that a quaternary ammonium salt can be recovered from an acrylonitrile electrohydromerization effluent with a very low concentration of such impurities by extracting the effluent with acrylonitrile and water and thereafter extracting at least a portion of the resulting quaternary ammonium salt-containing aqueous phase with acrylonitrile in the presence of not more than about 0.8 parts by weight of water per part of quaternary ammonium salt.

DETAILED DESCRIPTION OF THE INVENTION

The composition of an acrylonitrile electrohydrodimerization cathode compartment effluent can and normally does vary with changes in the electrolytic feed composition, process conditions, etc. However, the following composition may be regarded as typical.

| Component: | Weight percent |
|---|---|
| Adiponitrile | 15 |
| Acrylonitrile | 15 |
| Quaternary ammonium salt | 39 |
| Water | 29 |
| Impurities (reaction byproducts, divalent sulfate ions, etc.) | 2 |

Preferably after filtration for removal of solids, the effluent is fed to apparatus suitable for extraction with water and acrylonitrile. The apparatus can be of any conventional batch or continuous type such as one or a series of vessels for mixing and separation of the resulting organic and aqueous phases by decantation and/or centrifugal force, one or more towers containing packing or trays suitable for intimately contacting the effluent with the water and acrylonitrile, or the like. In a preferred embodiment, the filtered effluent is first diluted with water and then contacted with acrylonitrile, after which the resulting mixture is permitted to separate into an aqueous phase containing quaternary ammonium salt and water-soluble impurities and an organic phase containing acrylonitrile and most of the adiponitrile and other organic components from the electrohydrodimerization effluent. If desired, a portion of the aqueous phase can be recycled for use in dilution of the electrohydrodimerization effluent and the organic phase can be further extracted with water for more complete removal of the quaternary ammonium salt. The optimum proportions of acrylonitrile and water are dependent on the desired degree of separation of the organics and quaternary ammonium salt, the quantities of liquid conveniently handled, the efficiency of the extraction apparatus in use, etc.

At least a portion of the quaternary amomnium salt-containing aqueous phase is then normally fed into apparatus suitable for removing sufficient water to raise the salt concentration thereof to between about 45% and about 75% for recycle and reuse of the salt as the electrohydrodimerization electrolyte. In general, such apparatus is most conveniently an evaporator in which the aqueous phase may be heated to a temperature on the order of about 70° to 150° C. at a pressure suitable for evaporation of the water without substantial loss of the quaternary ammonium salt. As aforesaid, the quaternary ammonium salt-containing aqueous phase also includes water-soluble impurities which substantially lower the yield of adiponitrile on reuse of the salt in the electrohydrodimerization process. For example, an aqueous phase from which water has been evaporated to provide a salt concentration of about 62% by weight typically contains a divalent sulfate ion content of from 1% up to about 5% or more and between about 0.1 and about 1.0 milliequivalent of weak acids per grain of solution. Recycle of the quaternary ammonium salt-containing solution without removal of water-soluble impurities generally results in a gradual lowering of the adiponitrile yield to 10% or more below the yield obtained with the use of fresh salt as the process electrolyte.

In accordance with the present invention, the quaternary ammonium salt can be recovered with a surprisingly low concentration of such water-soluble impurities and with significant improvement of the yield of adiponitrile produced with the recovered salt by extracting the quaternary ammonium salt with acrylonitrile from at least a portion of the aqueous phase of the aforedescribed electrohydrodimerization effluent extraction and, more specifically, in the presence of not more than about 0.8 part by weight of water per part of quaternary ammonium salt. In some cases, the concentration of the aqueous phase previously carried out to facilitate recycle of the salt may be sufficient to lower the water content of the aqueous phase to not more than 0.8 part per part of the quaternary ammonium salt. Otherwise, further lowering of the water content by any convenient method (e.g evaporation) may be necessary to suitably prepare the aqueous phase for extraction with acrylonitrile in accordance with the process of this invention. In general, the extraction is most satisfactorily carried out in the presence of at least about 0.2 part of water per part of quaternary ammonium salt, although good results may be obtained in some cases with lower proportions of water that are adequate to provide a two-phase separation from the acrylonitrile.

Superior results are usually provided by using between about 2 and about 20 (preferably between 4 and 15) parts by weight of acrylonitrile per part of quaternary ammonium salt in the aqueous phase to be extracted, and then separating the resulting acrylonitrile phase containing quaternary ammonium salt from the aqueous phase containing a substantial proportion of the aforementioned impurities. Equivalent results are usually obtained with relatively lower ratios of acrylonitrile to quaternary ammonium salt within the foregoing ranges when the extraction is conducted in a multi-stage countercurrent system. For example, about ten parts of acrylonitrile per part of salt in the concentrated aqueous phase will generally provide approximately the same degree of salt purification and recovery in a three-stage countercurrent system as about fifteen parts of acrylonitrile per part of salt in a single stage batch operation.

Acrylonitrile used to extract the quaternary ammonium salt from the aqueous phase can be substantially pure or it can contain other components which will not interfere substantially to prevent the desired degree of salt extraction. For example, it may contain water in an amount preferably insufficient to raise the water content of the aqueous phase to be extracted substantially above 0.8 part per part of quaternary ammonium salt. In some cases, it may be advantageous to lower the water content of the aqueous phase to below that desirably present during the extraction with acrylonitrile, and then provide the desired ratio of water to salt by carrying out the extraction with acrylonitrile containing a suitable proportion of water, for example with water-containing acrylonitrile that has been purified of other organic constituents (such as adiponitrile) after recovery from the organic phase of the initial extraction of the electrohydrodimerization effluent.

In general, extraction of the aqueous phase with acrylonitrile can be carried out in any conventional apparatus such as the batch or continuous types mentioned hereinbefore, and under any conditions at which the aqueous phase and acrylonitrile are stable in liquid phase. Temperatures between about 15° and about 50° C. are normally suitable, as are subatmospheric, approximately atmospheric or superatmospheric pressures. The times for contact between the aqueous phase and acrylonitrile and, in batch operation, for separation of the resulting salt-containing acrylonitrile phase and impurity-containing aqueous phase will depend on the desired degree of salt purification and recovery, the equipment available, etc.

The following examples are included to illustrate the advantages of the process of this invention and are not representative of any limitation on the manner in which the process can be carried out. Percentages are by weight except where noted otherwise.

EXAMPLE I

The cathode compartment effluent from an acrylonitrile electrohydrodimerization process providing an adiponitrile yield of 80% contained approximately 15% adiponitrile, 15% acrylonitrile, 39% tetraethylammonium ethyl sulfate, 29% water and 2% impurities (including reaction byproducts such as propionitrile, bis-cyanoethylether, hydroxypropionitrile, hydrolysis products thereof and divalent sulfate ions). The effluent was filtered, diluted with about 0.155 pound of water per pound of effluent, and then thoroughly mixed with about 0.1 liter of acrylonitrile per pound of effluent in a mixing and settling tank. After separation of the resulting organic and aqueous phases, the aqueous phase was decanted and reextracted four times with about 0.1 liter of acrylonitrile per pound of effluent. The final aqueous phase was thoroughly stripped of acrylonitrile by fractional distillation and concentrated by evaporation to provide an aqueous mixture which contained 62.3% tetraethylammonium ethyl sulfate, 3.86% divalent sulfate ions and approximately 0.93 milliequivalents of weak acids per gram of mixture. When a portion of the concentrated mixture was recycled to the cathode compartment for reuse of the salt as electrolyte and the electrohydrodimerization process was carried out under conditions otherwise substantially the same as those used initially, the yield of adiponitrile was 70%. When another portion of the concentrated mixture was batch extracted with acrylonitrile containing 3.8% water in the amount of 10 volumes of the wet acrylonitrile per volume of tetraethylammonium ethyl sulfate in the mixture, the resulting aqueous phase contained 3.4% of the tetraethylammonium ethyl sulfate and 84% of the divalent sulfate ion from the concentrated extraction feed and the extracted salt contained 64.1% tetraethylammonium ethyl sulfate, 1.08% divalent sulfate ions and about 0.82 milliequivalent per gram of weak acids. When a portion of the extracted salt was recycled to the cathode compartment for reuse of the salt as electrolyte and the electrohydrodimerization process was carried out under conditions otherwise substantially the same as those used initially, the yield of adiponitrile was 75%.

EXAMPLES II–IV

When the extraction procedure of Example I was repeated three times with the exception that the concentrated mixtures contained 2.88%, 1.92% and 0.96% divalent sulfate ion, the resulting aqueous phases contained, respectively, 2.8%, 2.9% and 2.7% of the tetraethylammonium ethyl sulfate and 87%, 90% and 98% of the divalent sulfate ion from the concentrated mixtures.

EXAMPLES V AND VI

When the extraction procedure of Example I was repeated twice with the exception that the acrylonitrile contained 1.8% water and the concentrated mixtures contained 4.8% and 1.92% divalent sulfate ion, the resulting aqueous phases contained, respectively, 0.6% and 0.3% of the tetraethylammonium ethyl sulfate and 45% and 82% of the divalent sulfate ion from the concentrated mixtures.

EXAMPLE VII

When the extraction procedure of Example I was repeated with the exception that the concentrated mixture contained 4.8% divalent sulfate ion and was extracted with acrylonitrile containing 0.5% water in the amount of 6 volumes of the wet acrylonitrile per volume of tetraethylammonium ethyl sulfate in the mixture, the resulting aqueous phase contained 1.7% of the tetraethylammonium ethyl sulfate and 21% of the divalent sulfate ion from the concentrated mixture.

EXAMPLE VIII

A mixture containing 35% water, 3.05% divalent sulfate ion and 0.23 milliequivalent per gram of weak acids was prepared by combining concentrated aqueous phases from acrylonitrile-and-water extraction of acrylonitrile electrohydrodimerization effluents of the type described in Example I. When a portion of the mixture was recycled to the cathode compartment for reuse of the salt therein as electrolyte and the electrohydrodimerization process was carried out under conventional conditions, the crude reaction product contained 79.4% adiponitrile, 7.7% bis-cyanoethylether, 3.6% hydroxypropionitrile, 0.3% propionitrile and 9% higher-boiling byproducts. When another portion of the mixture was extracted in three countercurrent stages with acrylonitrile containing 3.8% water in the amount of 2.02 pounds of the wet acrylonitrile per pound of the concentrated solution, the resulting aqueous phase contained 83% of the divalent sulfate ion from the concentrated extraction feed and the extracted salt contained 0.16% divalent sulfate ions. When a portion of the extracted salt was recycled to the cathode compartment for reuse of the salt as electrolyte and the electrohydrodimerization process was carried out under conditions otherwise substantially the same as those used initially, the crude reaction product contained 85% adiponitrile, 3.9% bis-cyanoethylether, 2.9% hydroxypropionitrile, 0.4% propionitrile and 8% higher-boiling byproducts.

Although the process of this invention has been described in specific embodiments, it will be appreciated by those skilled in the art that many modifications and variations thereof may be employed without departing from the spirit and scope of the invention. Accordingly, it should be understood that the invention is not limited to the embodiments described herein except as it is defined in the appended claims.

We claim:
1. A method for recovering a quaternary ammonium salt from an acrylonitrile electrohydrodimerization effluent which comprises extracting said effluent with acrylonitrile and water, and thereafter extracting at least a portion of the resulting quaternary ammonium salt-containing aqueous phase with acrylonitrile in the presence of not more than about 0.8 part by weight of water per part of quaternary ammonium salt.

2. A method as defined in claim 1, in which the quaternary ammonium salt is a tetraalkylammonium alkylsulfate, arylsulfonate, or alkarylsulfonate in which each alkyl group contains from one to four carbon atoms.

3. A method as defined in claim 1, in which the quaternary ammonium salt is tetraethylammonium ethyl sulfate, tetramethylammonium methyl sulfate, tetramethylammonium toluene sulfonate, tetraethylammonium benzene sulfonate, trimethylethylammonium methyl sulfate, triethylmethylammonium ethyl sulfate, triethylmethylammonium benzene sulfonate or triethylmethylammonium toluene sulfonate.

4. A method as defined in claim 1, in which said effluent contains a substantially water-soluble impurity.

5. A method as defined in claim 4, in which the water-soluble impurity comprises an organic acid, a salt of an organic acid, or divalent sulfate ions.

6. A method as defined in claim 1, in which at least a portion of said aqueous phase is extracted with between about 2 and about 20 parts by weight of acrylonitrile per part of quaternary ammonium salt.

7. A method as defined in claim 1, in which at least a portion of said aqueous phase is extracted with acrylonitrile in the presence of at least about 0.2 part by weight of water per part of quaternary ammonium salt.

8. A method as defined in claim 1, which further comprises reusing quaternary ammonium salt extracted from said aqueous phase in the electrohydrodimerization of acrylonitrile.

9. A method for recovering a quaternary ammonium salt from an acrylonitrile electrohydrodimerization cathode compartment effluent containing a substantially water-soluble impurity which comprises extracting said effluent with acrylonitrile and water to provide an organic phase and a quaternary ammonium salt-containing aqueous phase, and thereafter extracting at least a portion of said aqueous phase with acrylonitrile in the presence of not more than about 0.8 part by weight of water per part of quatenary ammonium salt to provide an aqueous phase containing a substantial proportion of said impurity and a quaternary ammonium salt-containing acrylonitrile phase.

10. A method as defined in claim 9, in which at least a portion of said quaternary ammonium salt-containing aqueous phase is extracted with acrylonitrile from said organic phase.

References Cited

UNITED STATES PATENTS

| | | | |
|---|---|---|---|
| 3,193,477 | 7/1965 | Baizer | 204—73 |
| 3,223,704 | 12/1965 | Shibe et al. | 260—247.1 |
| 3,267,131 | 8/1966 | Campbell et al. | 260—465.8 |

HOWARD S. WILLIAMS, Primary Examiner

H. M. FLOURNOY, Assistant Examiner

U.S. Cl. X.R.

260—501.12